United States Patent
Yanagisawa et al.

(10) Patent No.: US 6,881,521 B2
(45) Date of Patent: Apr. 19, 2005

(54) CARBON FIBER, ELECTRODE MATERIAL FOR LITHIUM SECONDARY BATTERY, AND LITHIUM SECONDARY BATTERY

(75) Inventors: Takashi Yanagisawa, Tokyo (JP); Shunji Higaki, Nagareyama (JP)

(73) Assignee: GSI Creos Corporation, Tokyo (JP)

( * ) Notice: Subject to any disclaimer, the term of this patent is extended or adjusted under 35 U.S.C. 154(b) by 365 days.

(21) Appl. No.: 10/098,375

(22) Filed: Mar. 18, 2002

(65) Prior Publication Data

US 2003/0044685 A1 Mar. 6, 2003

(30) Foreign Application Priority Data

Aug. 29, 2001 (JP) ........................................ 2001-260494

(51) Int. Cl.$^7$ ............................................... H01M 4/58
(52) U.S. Cl. .............................. 429/231.8; 429/231.9; 361/502
(58) Field of Search ......................... 429/231.8, 231.9, 429/231.95; 361/502

(56) References Cited

U.S. PATENT DOCUMENTS

| | | |
|---|---|---|
| 5,780,101 A | 7/1998 | Nolan et al. |
| 6,654,229 B1 * | 11/2003 | Yanagisawa et al. ........ 361/502 |

FOREIGN PATENT DOCUMENTS

| | | | |
|---|---|---|---|
| EP | 0 198 558 A2 | 10/1986 | |
| EP | 0 762 522 A1 | 3/1997 | |
| EP | 0 935 302 A1 | 8/1999 | |
| EP | 1 122 344 A2 | 8/2001 | |
| EP | 1122344 | * 8/2001 | ............ H01M/4/58 |
| EP | 1246211 | * 10/2002 | ............ H01G/9/058 |
| EP | 1262579 | * 12/2002 | ............ D01F/9/127 |
| EP | 1288351 | * 3/2003 | ............ D01F/9/127 |
| EP | 1288352 | * 3/2003 | ............ D01F/9/127 |
| WO | WO 95/07551 | 3/1995 | |

OTHER PUBLICATIONS

Terrones et al., "Graphitic cones in palladium catalysed carbon nanofibres", Chemical Physics Letters, Elsevier Science Ltd., 343, pp. 241–250, 2001.

Endo et al., "Pyrolytic Carbon Nanotubes from Vapor–Grown Carbon Fibers", Carbon, Elsevier Science Ltd., vol. 33, No. 7, pp. 873–881, 1995.

Endo et al., "Vapor–grown carbon fibers (VGCFs) Basic properties and their battery applications", Carbon, Elsevier Science Ltd., 39, pp. 1287–1297, 2001.

Endo et al., "Recent development of carbon materials for Li ion batteries", Carbon, Elsevier Science Ltd., 38, pp. 183–197, 2000.

(Continued)

Primary Examiner—Mark Ruthkosky
(74) Attorney, Agent, or Firm—Oliff & Berridge, PLC

(57) ABSTRACT

A carbon fiber has a coaxial stacking morphology of truncated conical tubular graphene layers, wherein each of the truncated conical tubular graphene layers includes a hexagonal carbon layer and has a large ring end at one end and a small ring end at the other end in an axial direction. The hexagonal carbon layers are exposed on at least a part of the large ring ends. Part of carbon atoms of the hexagonal carbon layers are replaced with boron atoms, whereby projections with the boron atoms at the top are formed. An electrode material for a secondary battery using the carbon fiber excels in lifetime performance, has a large electric energy density, enables an increase in capacity, and excels in conductivity and electrode reinforcement.

12 Claims, 18 Drawing Sheets

OTHER PUBLICATIONS

Flandrois et al., "Carbon materials for lithium–ion rechargeable batteries", Carbon, Elsevier Science Ltd., 37, pp. 165–180, 1999.

Endo et al., "Structural characterization of cup–stacked–type nanofibers with an entirely hollow core", Applied Physics Letters, vol. 80, No. 7, Feb. 18, 2002, pp. 1267–1269.

Kim et al., "Effect of ball milling on morphology of cup–stacked carbon nanotubes", Chemical Physics Letters, Apr. 2, 2002.

Endo et al., "Structural characterization of cup–stacked–type nanofibers with an entirely hollow core", Applied Physics Letters, vol. 80, No. 7, Feb. 18, 2002, pp. 1267–1269.

Kim et al., "Effect of ball milling on morphology of cup–stacked carbon nanotubes", Chemical Physics Letters, Mar. 2, 2002.

* cited by examiner

CARBON FIBER, ELECTRODE MATERIAL FOR LITHIUM SECONDARY BATTERY, AND LITHIUM SECONDARY BATTERY

Japanese Patent Application No. 2001-260494, filed on Aug. 29, 2001, is hereby incorporated by reference in its entirety.

BACKGROUND OF THE INVENTION

The present invention relates to a carbon fiber, an electrode material for a lithium secondary battery, and a lithium secondary battery.

Among various types of secondary batteries, a lithium secondary battery is used as a power supply indispensable for information communications equipment represented by portable telephones and notebook personal computers, and contributes to reduction of the size and weight of mobile equipment.

Graphite or carbon fibers are used as an electrode material (additive) for the lithium secondary battery in order to provide the electrode with strength, conductivity, and the like.

A cathode material and an anode material for the lithium secondary battery have a layered structure. Upon charging, lithium ions are extracted from the cathode and intercalated between hexagonal carbon layers of the anode, whereby a lithium intercalation compound is formed. Upon discharging, a reaction occurs in which lithium ions are moved from the carbon anode to the cathode.

As described above, the carbon electrode material has a function of storing and releasing lithium ions. The quality of these storing and releasing functions greatly affects characteristics of the battery such as charge and discharge characteristics.

Graphite, in particular, anisotropic graphite has a typical layered structure and forms graphite intercalation compounds (GICs) when various types of atoms and molecules are introduced. When lithium ions are intercalated between the graphite layers, the electrode material (anode material, in particular) expands due to an increase in the gap between layers. If the charge and discharge cycles are repeated in such a state, the electrode may be deformed or lithium metal may be deposited, thereby causing capacity deterioration or internal short circuits. Moreover, if the gap between layers is expanded and contracted repeatedly, the graphite crystal structure may be damaged, whereby the cycle characteristics (lifetime) may be adversely affected. In addition, graphite exhibits inferior conductivity as the electrode material.

As a carbon material, a tube-shaped carbon fiber manufactured using a vapor growth process is known. In this tube-shaped carbon fiber, a plurality of concentric hexagonal carbon layers is stacked. In the case of using this carbon fiber as an anode material, lithium ions are intercalated only from the edges of the fiber, whereby sufficient lithium intercalation compounds are not formed. Therefore, a sufficient capacity cannot be obtained due to low electric energy density. Moreover, since the hexagonal carbon layers are in the shape of concentric circles, the hexagonal carbon layers are expanded by force when lithium ions are intercalated. This causes stress to occur, whereby the crystal structure may be destroyed.

BRIEF SUMMARY OF THE INVENTION

The present invention has been achieved to solve the above-described problems. The present invention may provide a carbon fiber which can be suitably used as various types of electrode materials and the like, an electrode material for a lithium secondary battery excelling in lifetime performance and capable of increasing capacity, and a lithium secondary battery.

In order to solve the above problems, a first aspect of the present invention provides a carbon fiber comprising a coaxial stacking morphology of truncated conical tubular graphene layers, wherein each of the truncated conical tubular graphene layers includes a hexagonal carbon layer.

In other words, this carbon fiber has a cup-stacked structure or lampshade-stacked structure in which a number of hexagonal carbon layers in the shape of a bottomless cup are stacked. The coaxial stacking morphology of the truncated conical tubular graphene layers may have a shape of a hollow core with no bridge. According to such a structure, each of the truncated conical tubular graphene layers has a large ring end at one end and a small ring end at the other end in an axial direction, wherein edges of the hexagonal carbon layers are exposed at the large ring ends of the outer surface and the small ring ends of the inner surface. In other words, the edges of the tilted hexagonal carbon layers having a herring-bone structure are exposed in layers.

In an ordinary carbon fiber with a herring-bone structure, a number of hexagonal carbon layers in the shape of a cup having a bottom are stacked. However, the carbon fiber according to the first aspect of the present invention has a hollow structure with no bridge and has a length ranging from several tens of nanometers to several tens of microns. An electrolyte can be introduced into the hollow portion and held therein.

If the coaxial stacking morphology of the truncated conical tubular graphene layers is vapor grown, a wide area of an outer surface or an inner surface may be covered with a deposited film of an excess amount of pyrolytic carbon. However, at least part of edges of the hexagonal carbon layers may be exposed at the large ring ends on the outer surface side or at the small ring ends on the inner surface side.

The edges of the hexagonal carbon layers exposed on the outer surface or the inner surface of the carbon fiber have an extremely high degree of activity, exhibit good affinity to various types of materials, and excel in adhesion to base materials such as resins. Therefore, a composite excelling in tensile strength and compressive strength can be obtained.

According to the first aspect of the present invention, part or all of the deposited films formed over the outer surface or the inner surface during the vapor growth process of the carbon fiber may be removed by a treatment to be performed later. Since the deposited layers are formed of an excess amount of insufficiently crystallized amorphous carbon, the surfaces of the deposited layers are inactive.

In the carbon fiber according to the first aspect of the present invention, an outer surface of the carbon fiber may be formed of the large ring ends stacked in the axial direction; and exposed part of the edges of the hexagonal carbon layers may have an area equal to or more than 2% of an area of the outer surface, and preferably 7% of an area of the outer surface.

The positions of the large ring ends forming the outer surface may be irregular, and the outer surface may have minute irregularity at the level of atoms.

Similarly, an inner surface of the carbon fiber may be formed of the small ring ends stacked in the axial direction; and positions of the small ring ends forming the inner surface may be irregular, and the inner surface may have minute irregularity at the level of atoms. This carbon fiber may have a structure in which several tens of thousands to several hundreds of thousands of hexagonal carbon layers are stacked. However, the carbon fiber may be divided so that one to several hundreds of hexagonal carbon layers are stacked.

This carbon fiber is not graphitized by a heat treatment at a temperature of 2500° C. or more. This is clear from the fact that the D peak (1360 cm$^{-1}$) of the Raman spectrum does not disappear after a heat treatment at a high temperature of 2500° C. or more.

In a second aspect of the present invention, this carbon fiber is used as a cathode material (additive to an electrode) or an anode material (electrode material or additive to an electrode) of a lithium secondary battery.

A third aspect of the present invention provides a lithium secondary battery in which the above carbon fiber is used for a cathode and/or an anode.

A lithium secondary battery excelling in high output characteristics, lifetime performance, and stability of performance and enabling an increase in the capacity can be provided by using the carbon fiber as the electrode material for the lithium secondary battery.

DETAILED DESCRIPTION OF THE EMBODIMENT

One embodiment of the present invention is described below in detail with reference to the drawings.

A carbon fiber according to the present embodiment is a carbon fiber in which a large number of hexagonal carbon layers in the shape of a bottomless cup are stacked (hereinafter simply called "carbon fiber" or "carbon fiber having a herring-bone structure").

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at a specific angle.

In an ordinary carbon fiber with a herring-bone structure, a number of hexagonal carbon layers in the shape of a cup having a bottom are stacked. However, the vapor-grown carbon fiber according to one embodiment of the present invention has a structure in which a number of hexagonal carbon layers in the shape of a bottomless cup are stacked (this bottomless carbon fiber is hereinafter called "carbon fiber having a herring-bone structure").

Figure 18:
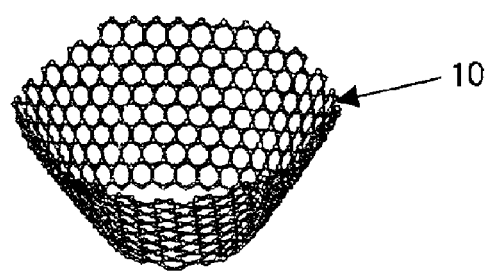
FIG. 18 is a computer graphic showing a hexagonal carbon layer, which is a unit of the coaxial stacking morphology of the truncated conical tubular graphene layers shown in FIG. 17, based on rigorous quantum theoretical calculation.
Figure 17:
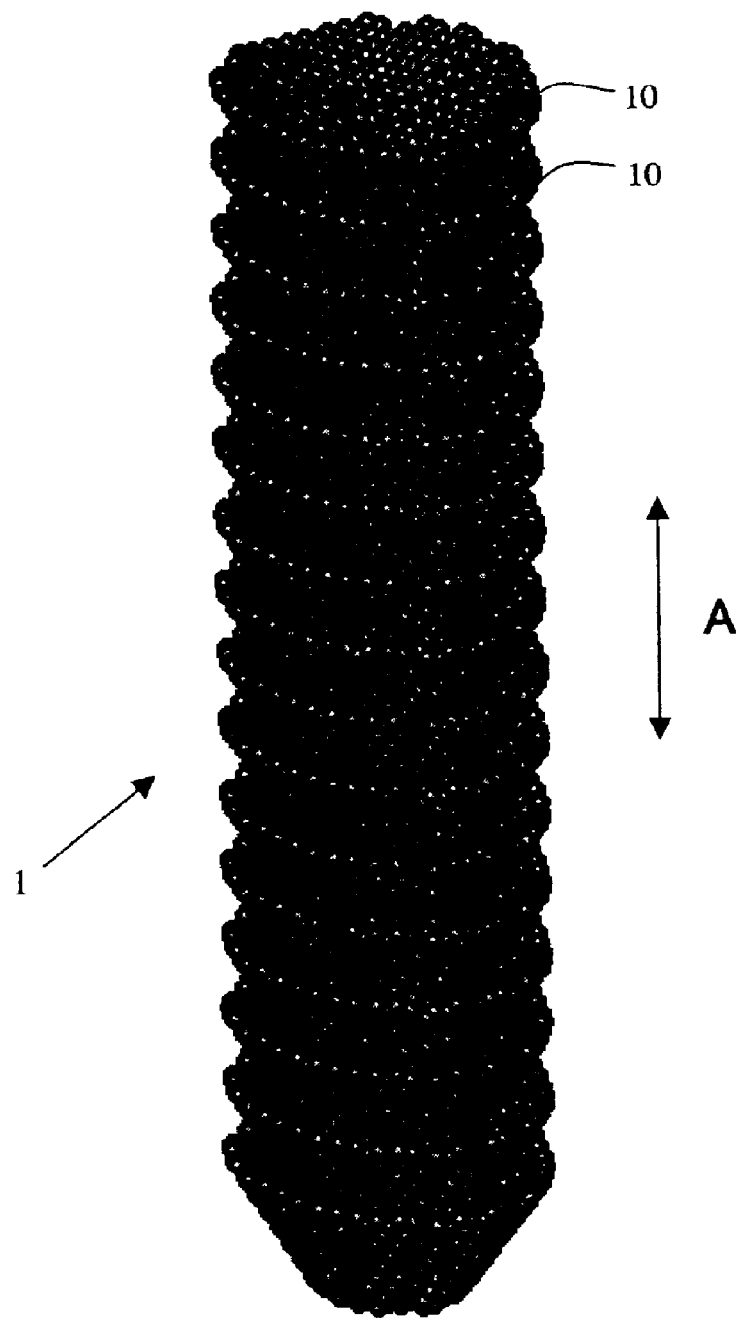
FIG. 17 is a computer graphic showing a coaxial stacking morphology of truncated conical tubular graphene layers based on rigorous quantum theoretical calculation.

Specifically, this carbon fiber 1 has a coaxial stacking morphology of truncated conical tubular graphene layers shown by a computer graphic in FIG. 17. Each of the truncated conical tubular graphene layers is formed of a hexagonal carbon layer 10 as shown in FIG. 18. Although the actual hexagonal carbon layers are stacked densely in an axial direction A, they are stacked roughly in FIG. 17 for convenience of description.

Figure 19:
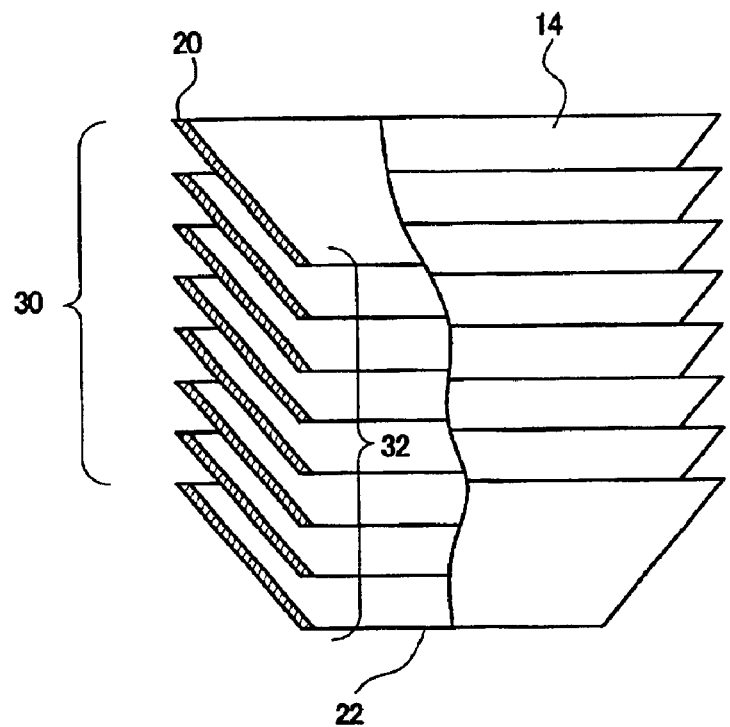
FIG. 19 is a schematic view of a large ring end and a small ring end respectively forming an outer surface and an inner surface of the coaxial stacking morphology of truncated conical tubular graphene layers.

FIG. 19 is a schematic view of FIG. 17. Each of the hexagonal carbon layers 10 has a large ring end 20 at one end and a small ring end 22 at the other end in the axial direction. The large ring ends 20 are stacked in the axial direction A to form an outer surface 30 of the carbon fiber 1. The small ring ends 22 are stacked in the axial direction A to form an inner surface 32 of the carbon fiber 1. The carbon fiber 1 is thus in the shape of a hollow core with no bridge and has a center hole 14.

An example of a method of manufacturing the carbon fiber 1 shown in FIG. 17 is described below.

First, an example of a method of manufacturing the carbon fiber having a herring-bone structure is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3 \times 10^{-7}$ mol/s. The reaction temperature and the reaction time were about 1100° C. and about 20 minutes, respectively. As a result, a carbon fiber having a herring-bone structure with an average diameter of about 100 nm was obtained. A hollow carbon fiber having no bridge at a length ranging from several tens of nanometers to several tens of microns, in which a number of hexagonal carbon layers in the shape of a bottomless cup are stacked, is obtained by adjusting the flow rate of the raw material and the reaction temperature (which are changed depending on the size of the reactor). The length of the carbon fiber in which a number of hexagonal carbon layers in the shape of a bottomless cup are stacked may be adjusted by grinding so that one to several hundreds of hexagonal carbon layers in the shape of a bottomless cup are stacked as described later.

Before describing boron doping, characteristics of the carbon fiber thus obtained are described below.

Figure 1:
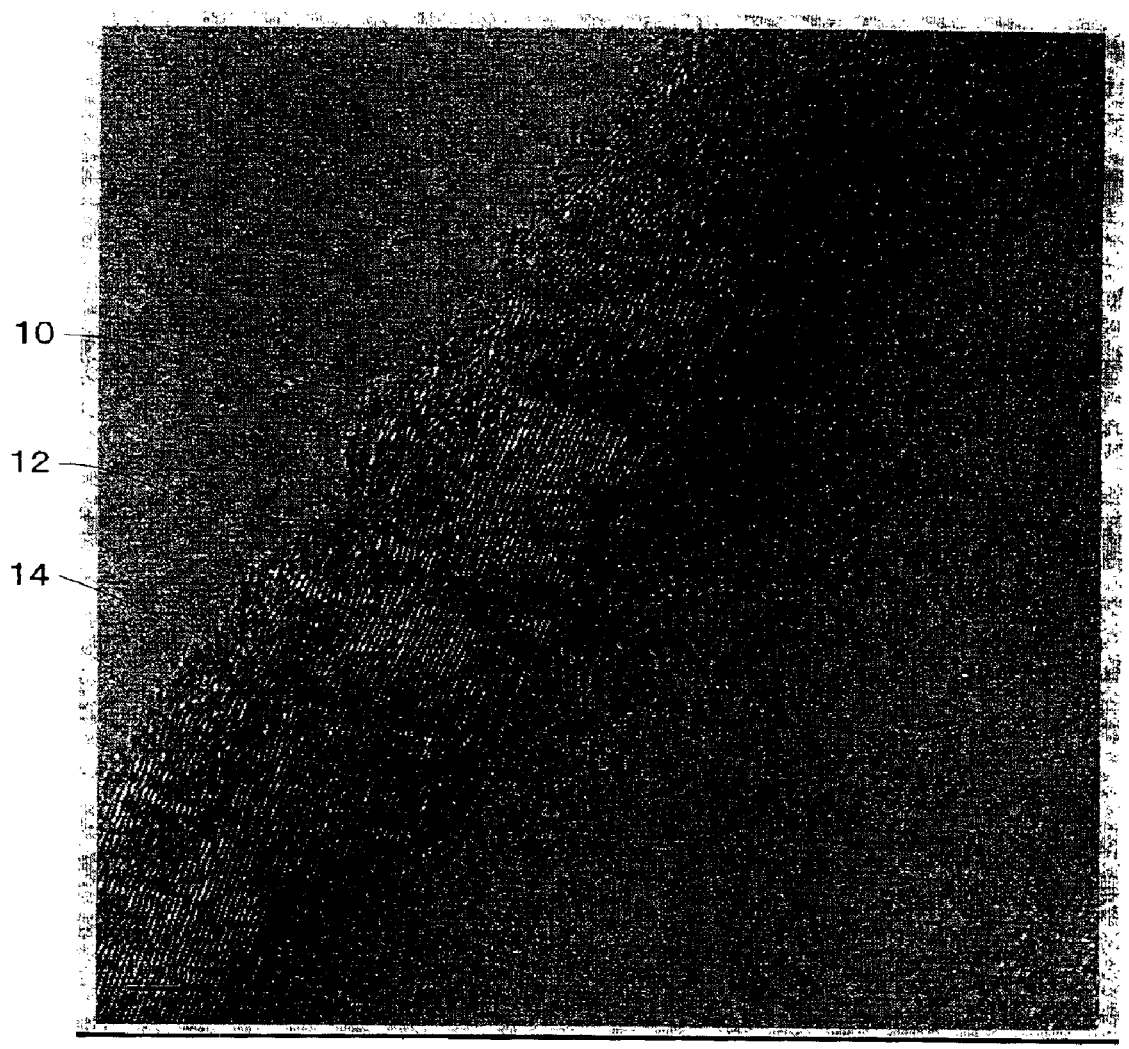
FIG. 1 is a copy of a transmission electron micrograph showing a carbon fiber having a herring-bone structure manufactured using a vapor growth process.
Figure 2:
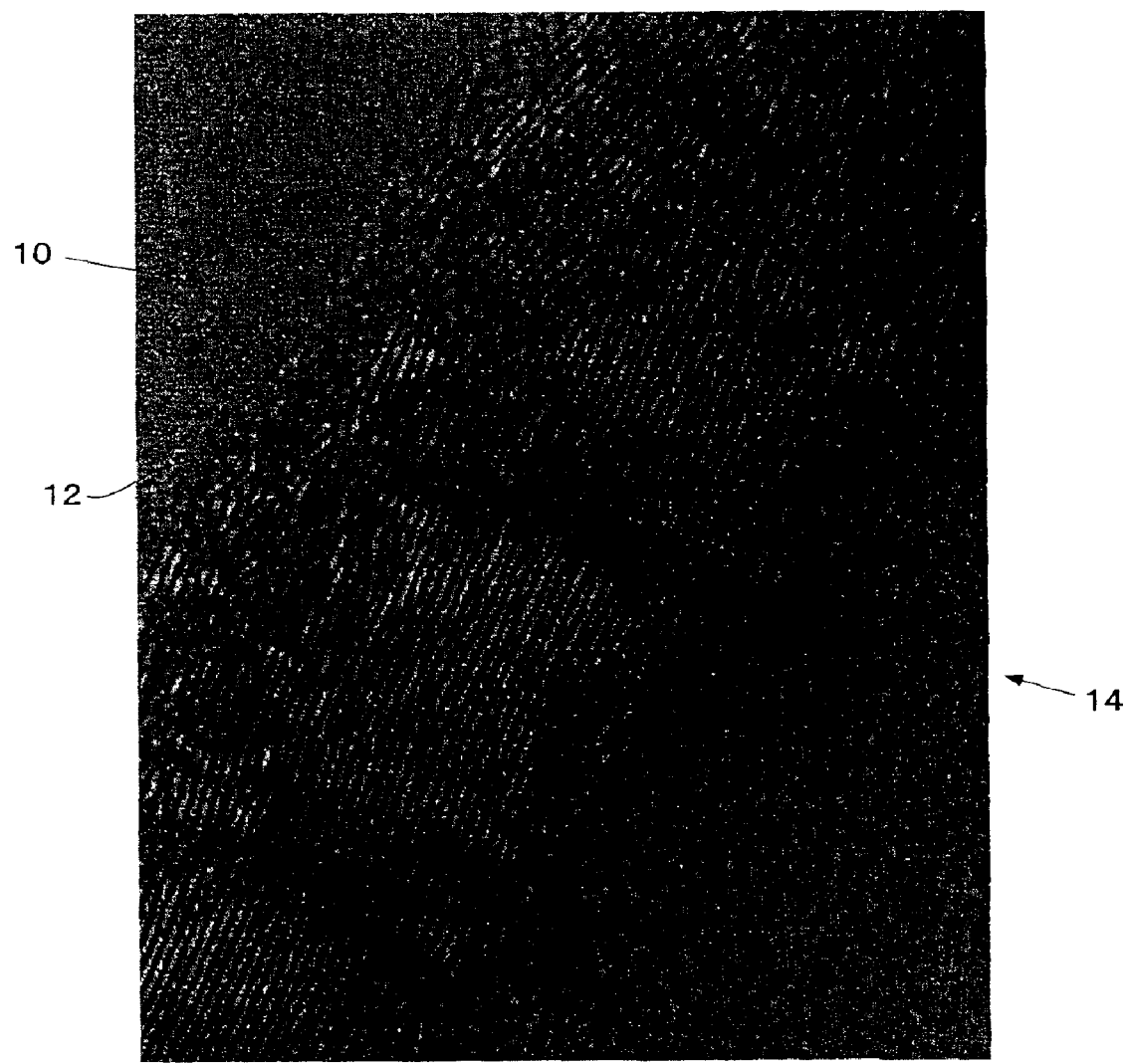
FIG. 2 is a copy of an enlarged micrograph of FIG. 1.
Figure 3:
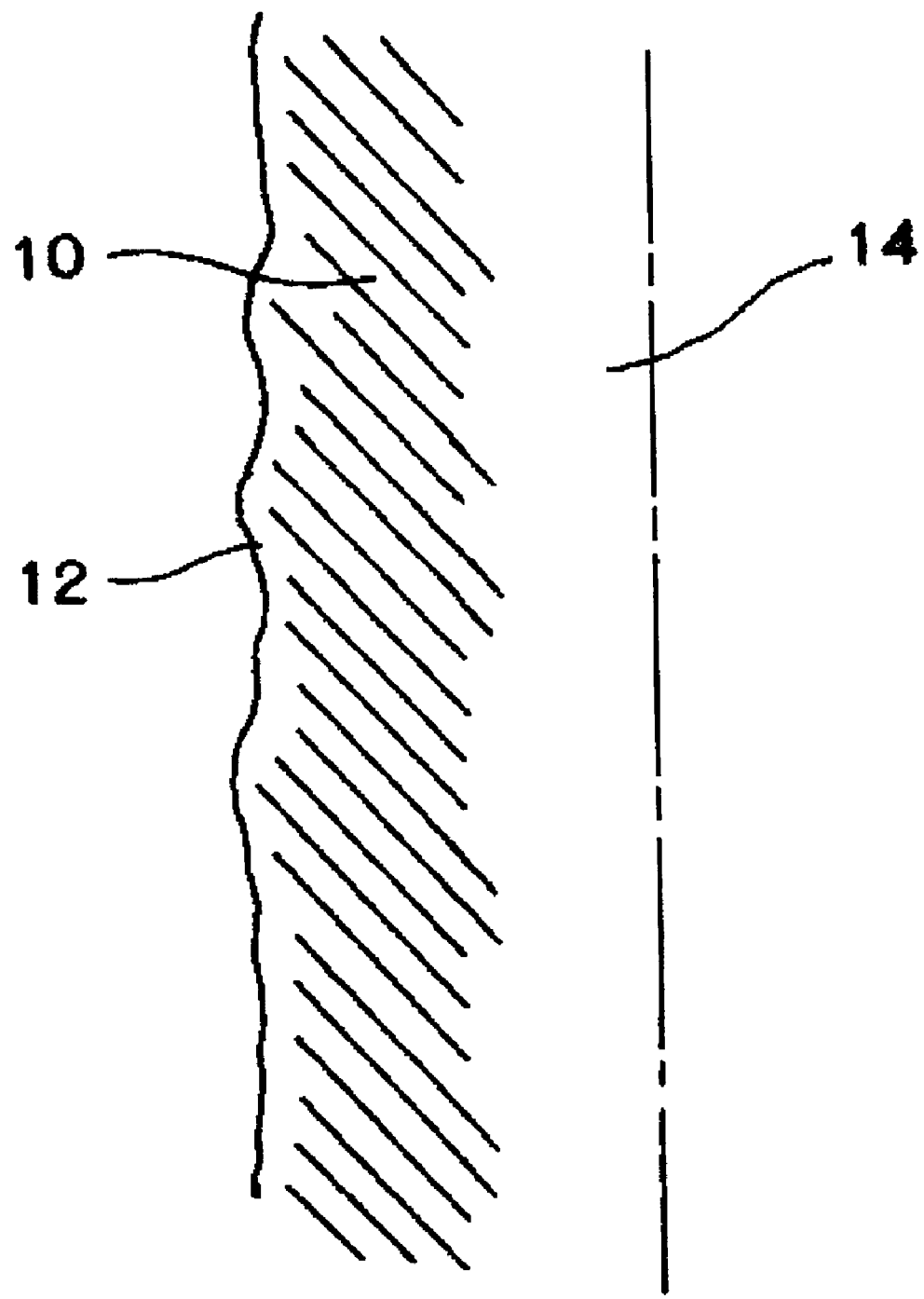
FIG. 3 is a schematic view of FIG. 2.

FIG. 1 is a copy of a transmission electron micrograph showing the carbon fiber having a herring-bone structure manufactured using the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. A reference numeral 14 indicates the center hole. The center hole 14 has a sufficient space for holding an electrolyte.

Figure 20:
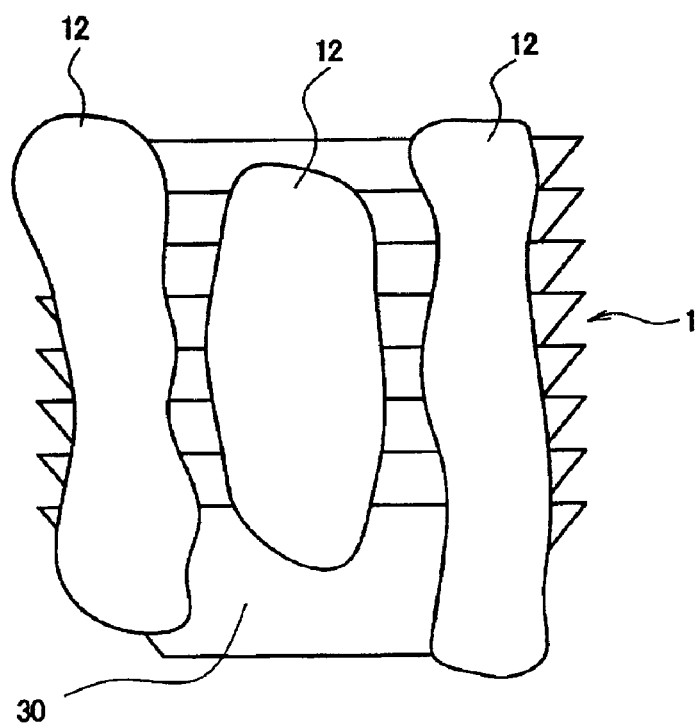
FIG. 20 is a schematic view of a deposited film of pyrolytic carbon formed over a wide range of an outer surface of a carbon fiber.

FIG. 20 is a view schematically showing a state in which the deposited films 12 are formed over a wide area of the outer surface 30 of the carbon fiber 1. As shown in FIG. 20, the hexagonal carbon layers 10 are exposed on the large ring ends 20 in the areas in which the outer surface of the carbon fiber 1 is not covered with the deposited films 12. These areas have a high degree of activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520° C. to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
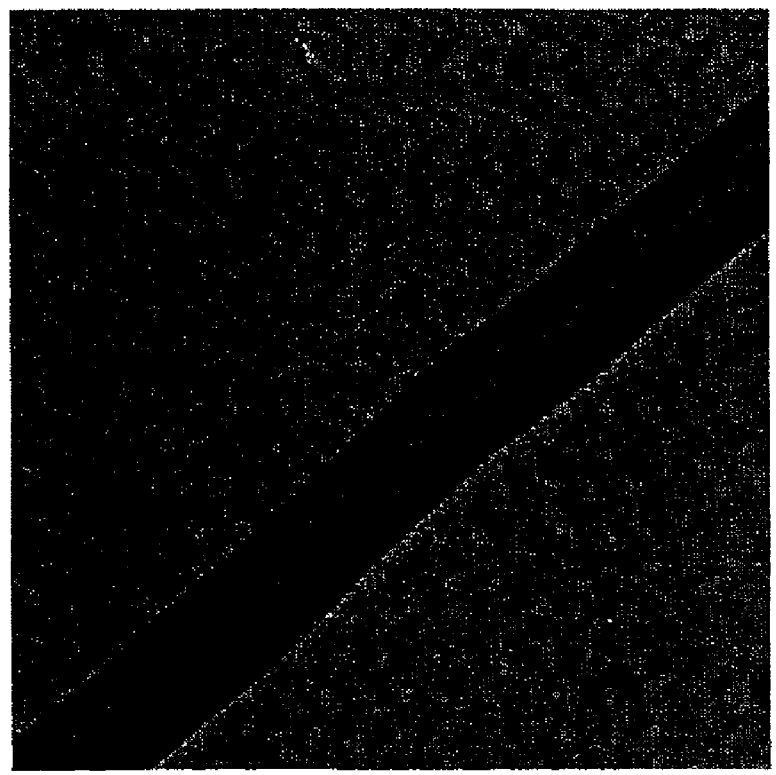
FIG. 4 is a copy of a transmission electron micrograph showing a carbon fiber having a herring-bone structure heated at a temperature of about 530° C. for one hour in air.
Figure 5:
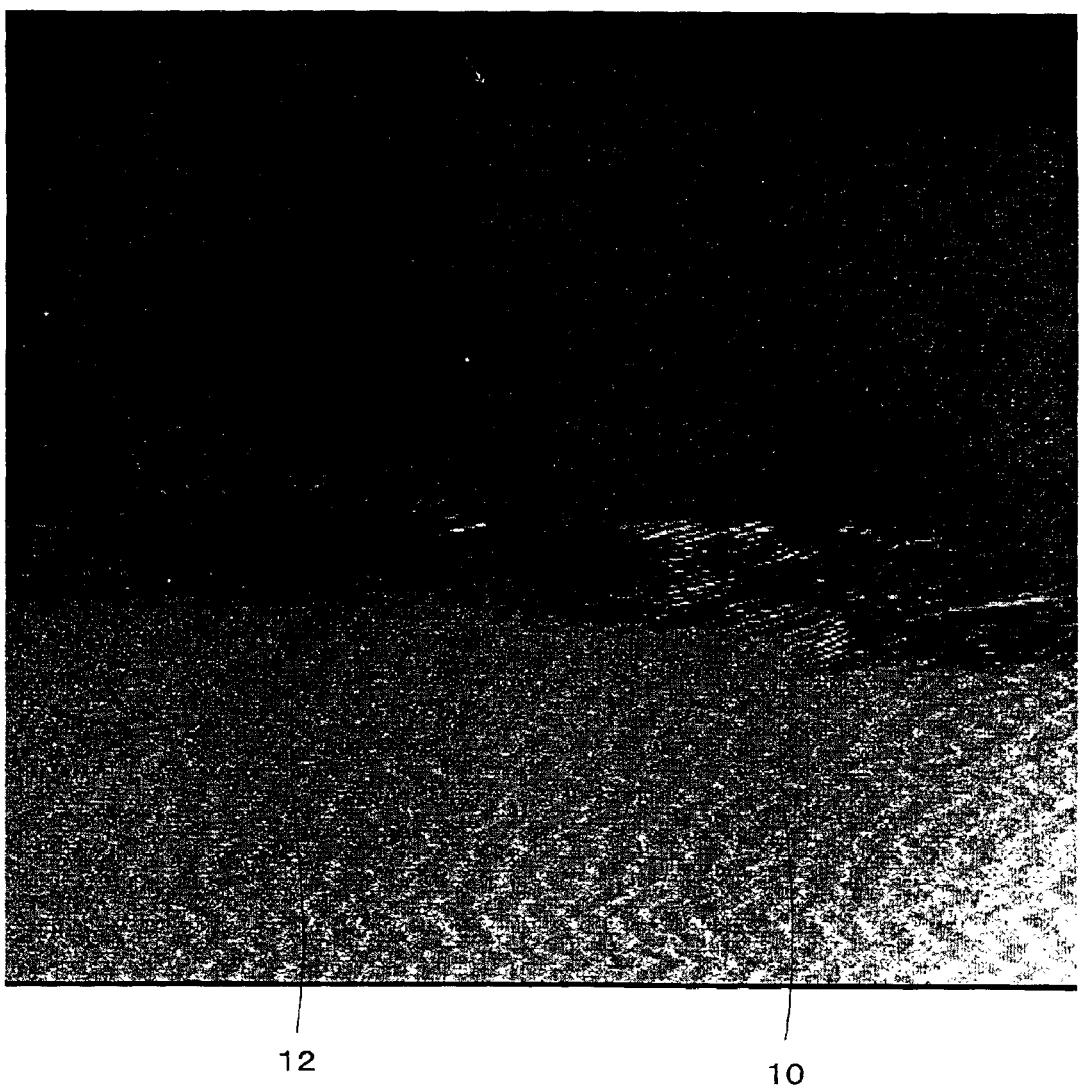
FIG. 5 is a copy of an enlarged micrograph of FIG. 4.

FIG. 4 is a copy of a transmission electron micrograph of the carbon fiber having a herring-bone structure heated at a temperature of about 530° C. for one hour in air. FIG. 5 is an enlarged view of FIG. 4, FIG. 6 is a further enlarged view of FIG. 5, and FIG. 7 is a schematic view of FIG. 6.

Figure 6:
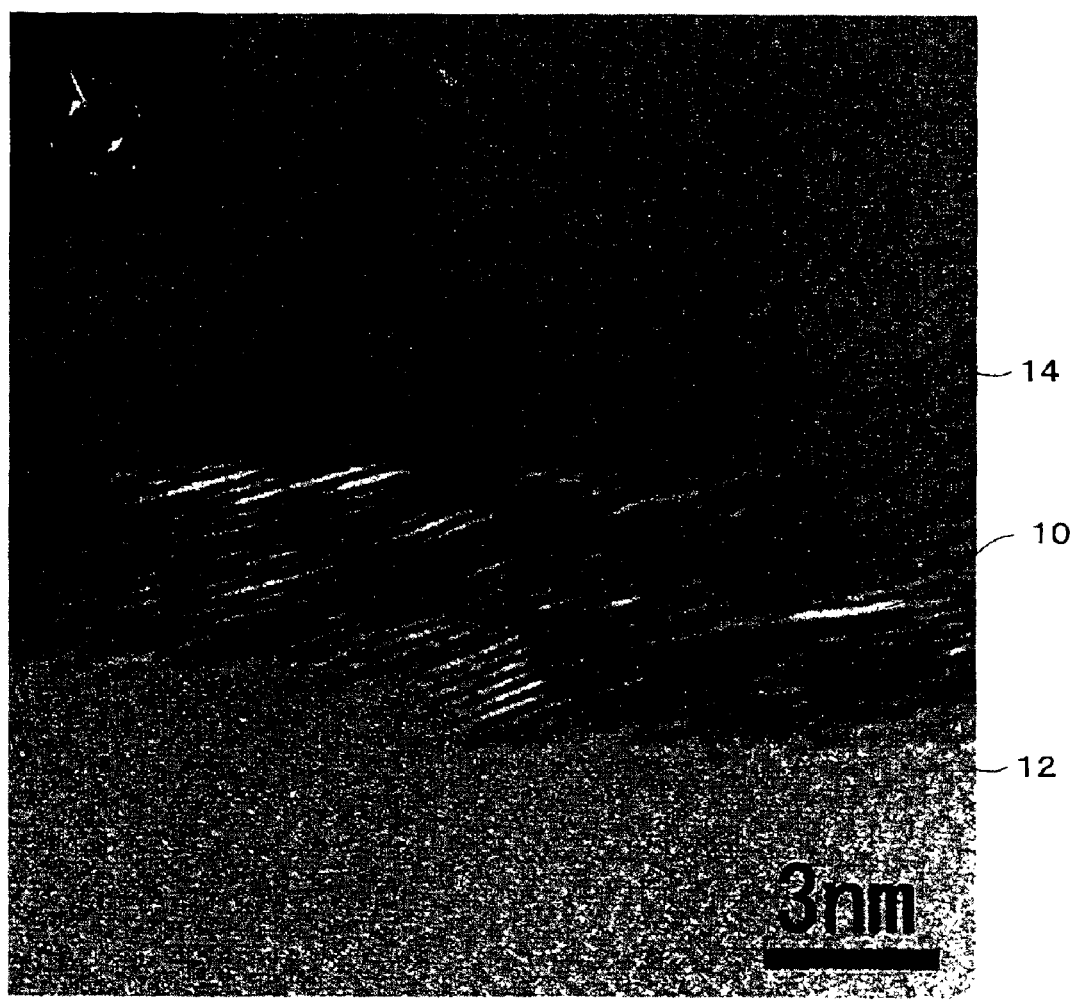
FIG. 6 is a copy of a further enlarged micrograph of FIG. 5.
Figure 7:
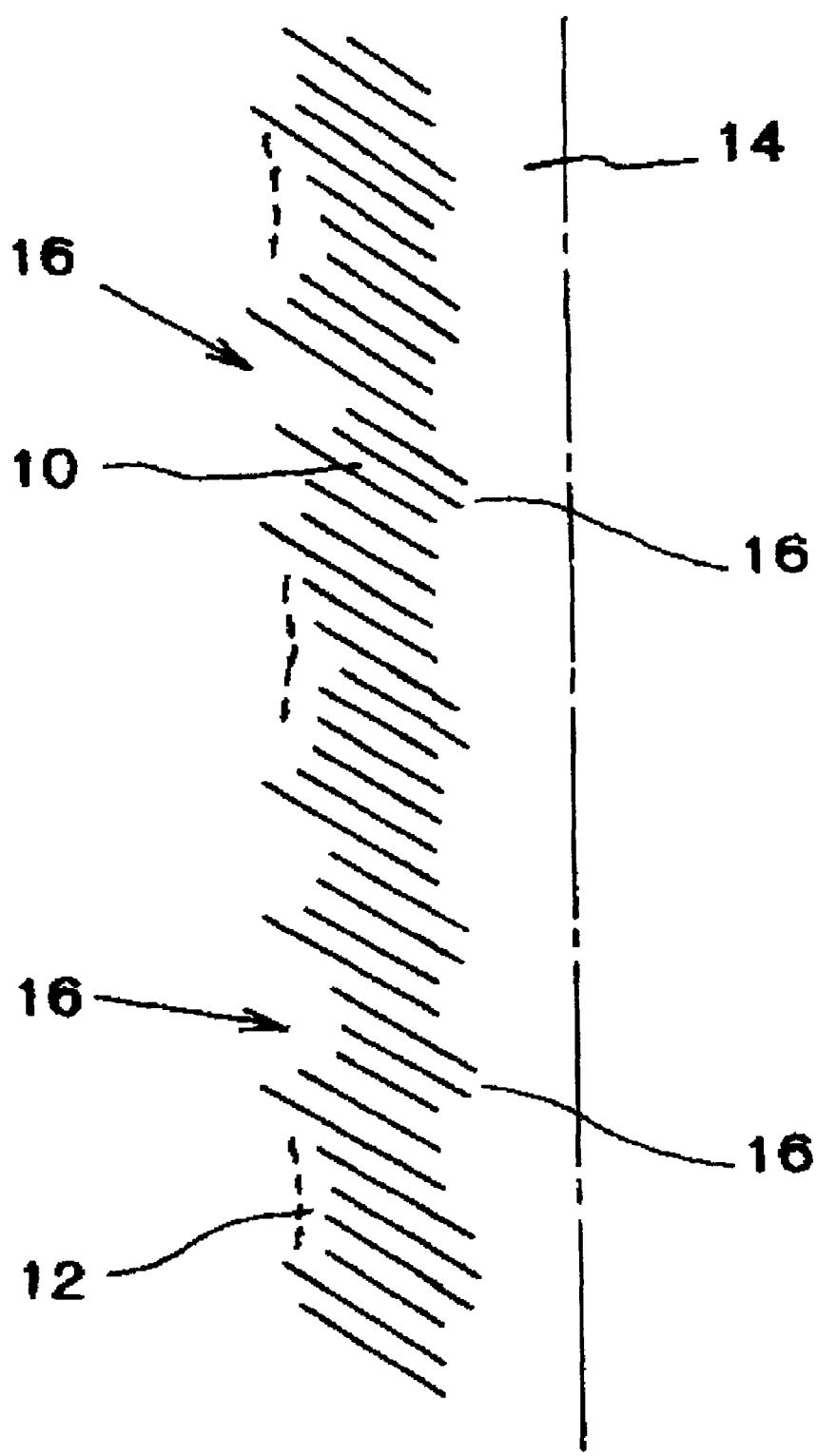
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 10 in which a number of hexagonal carbon layers in the shape of a bottomless cup are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level of atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high degree of activity and easily bond to other atoms. The reasons therefor are considered to be as follows. The heat treatment in air causes the deposited layers 12 to be removed and the number of functional groups containing oxygen such as a phenolic hydroxyl group, carboxyl group, quinone type carbonyl group, and lactone group to be increased on the exposed edges of the hexagonal carbon layers 10. These functional groups containing oxygen have high hydrophilicity and high affinity to various types of substances.

In addition, the hollow structure and the irregularities 16 contribute to the anchor effect to a large extent.

When forming an anode by securing a large number of carbon fibers using a resin binder, applying the carbon fibers to copper foil, and drying the carbon fibers, the carbon fibers exhibit good adhesion to the binder. This is considered to contribute to an increase in lifetime of the electrode.

Figure 8:
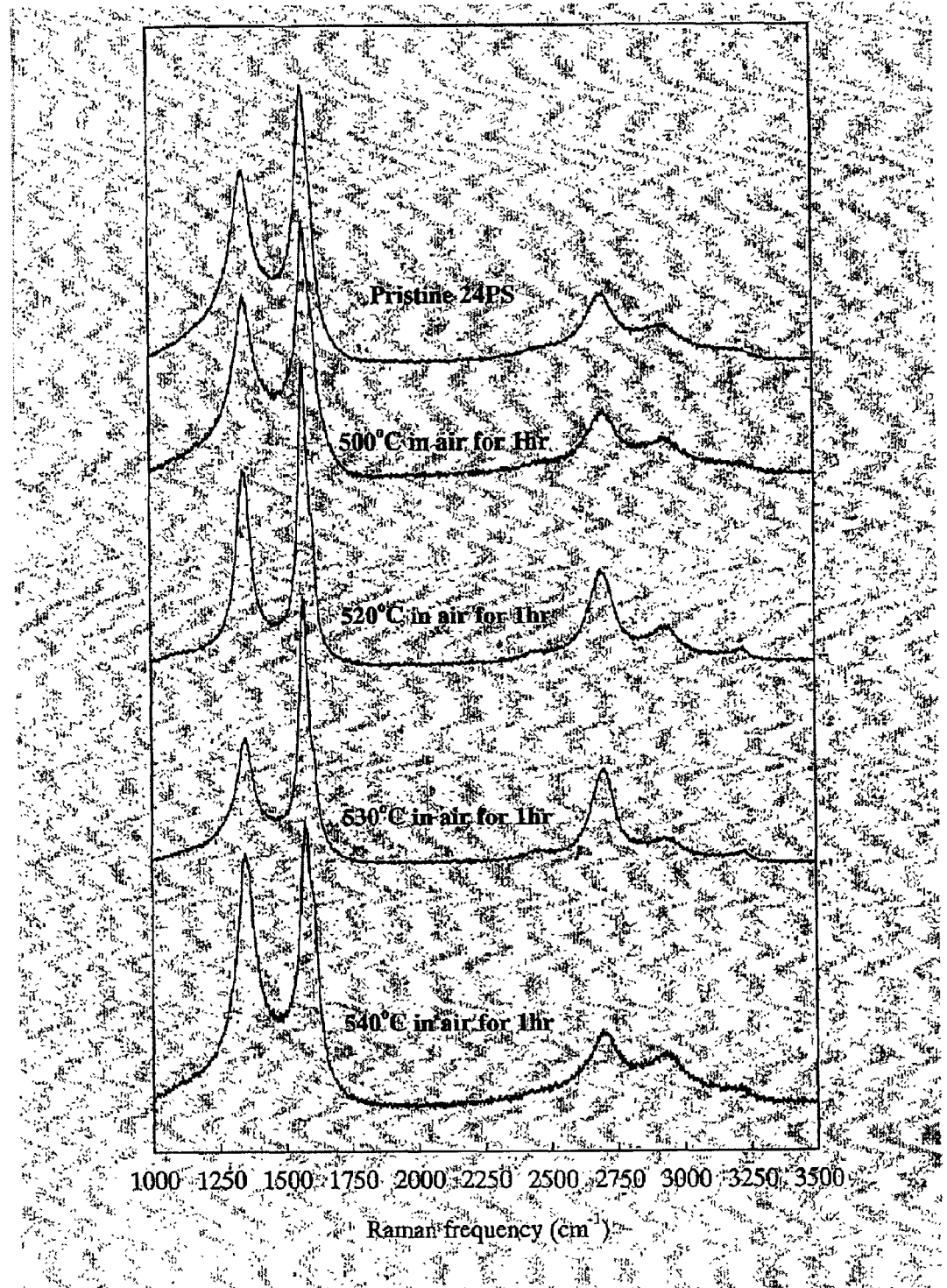
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 cm$^{-1}$) and the G peak (1580 cm$^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. However, the turbostratic structure allows intercalation of atoms having a size such as a lithium ion.

Figure 9:
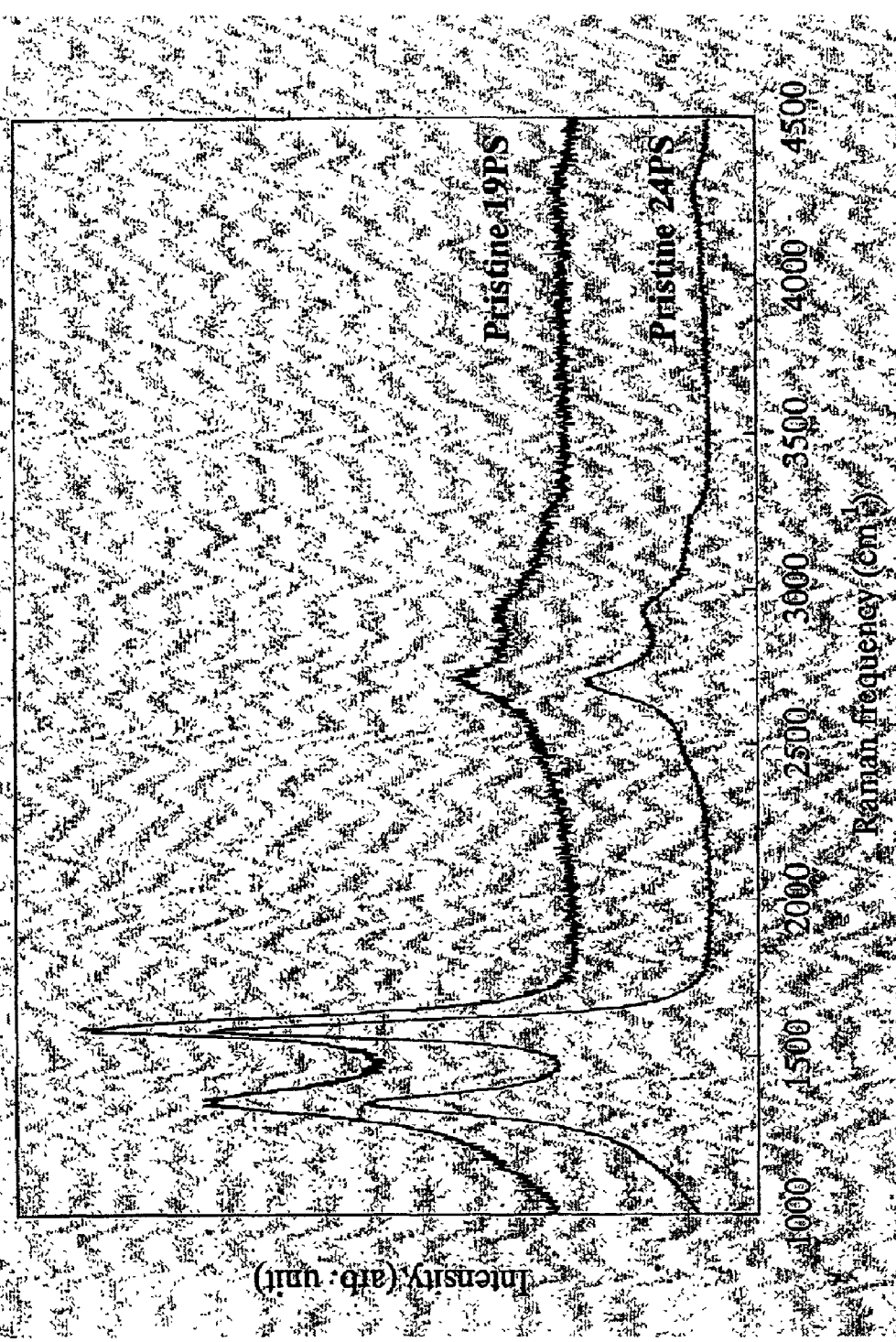
FIG. 9 is a characteristic chart showing the Raman spectra of carbon fiber samples No. 19PS and No. 24PS in which edges of hexagonal carbon layers are exposed by the heat treatment.

FIG. 9 shows the Raman spectra of carbon fiber samples No. 19PS and No. 24PS in which the edges of the hexagonal carbon layers are exposed by the above heat treatment.

Figure 10:
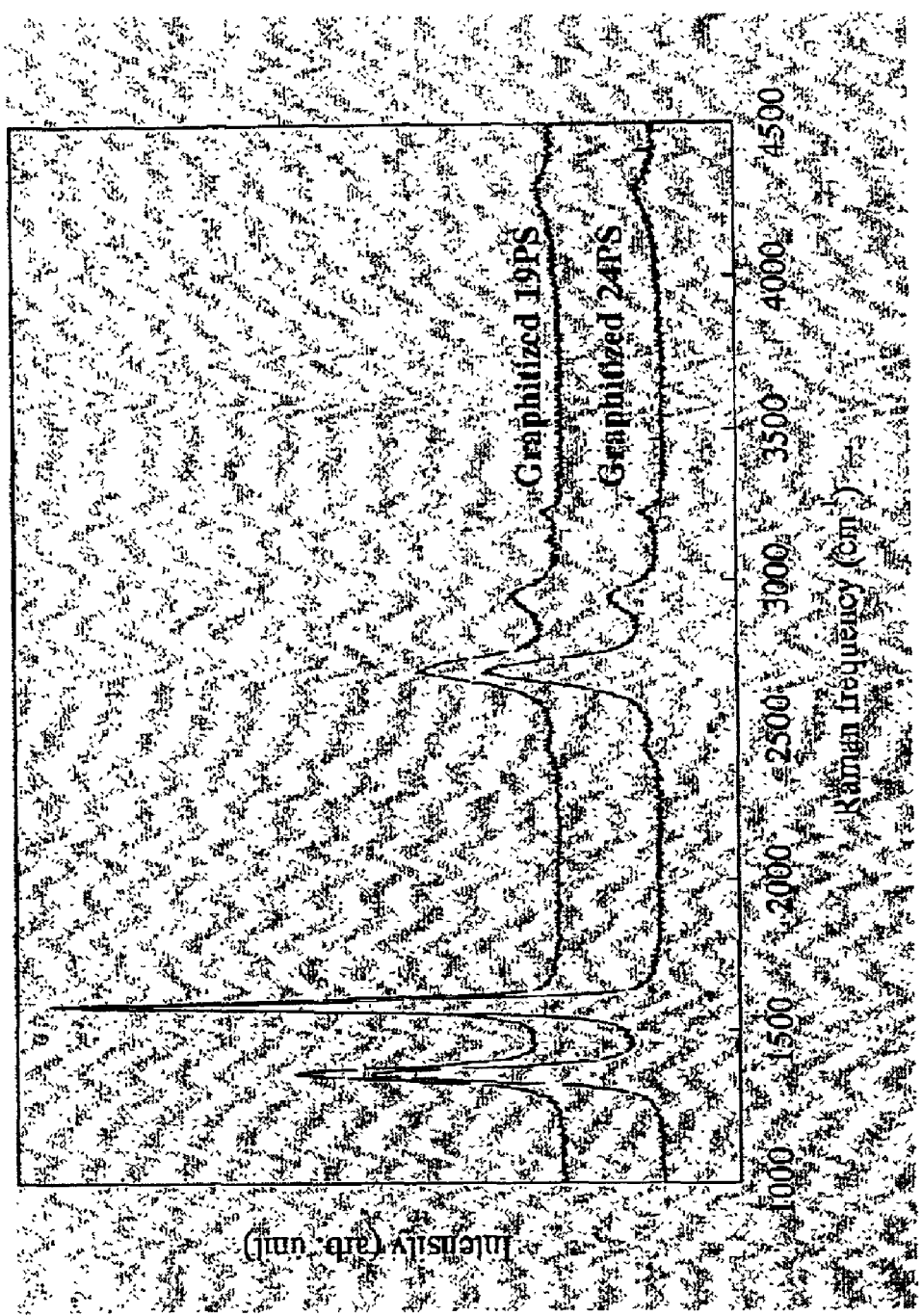
FIG. 10 is a characteristic chart showing the Raman spectra of the carbon fiber samples No. 19PS and No. 24PS, in which the edges of the hexagonal carbon layers are exposed, after heating at 3000° C.

FIG. 10 shows the Raman spectra of the carbon fiber samples No. 19PS and No. 24PS, heated at 3000° C. (common graphitization treatment) after the edges of the hexagonal carbon layers has been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The resulting carbon fiber in which the edges of the hexagonal carbon layers are exposed is used as an electrode material (additive to an electrode) of a lithium secondary battery.

Figure 11:
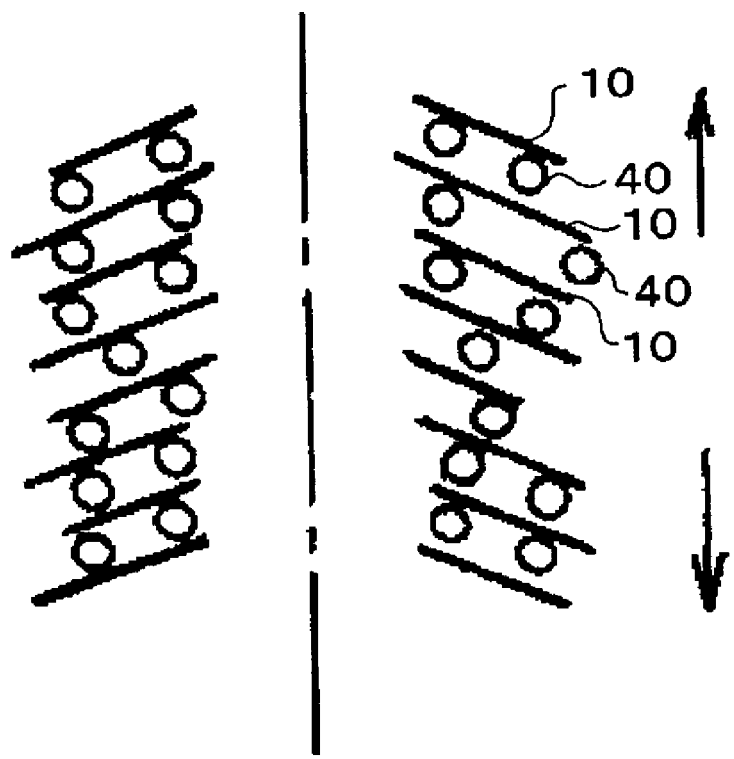
FIG. 11 is a view showing a state in which lithium ions are intercalated between the hexagonal carbon layers.
Figure 12:
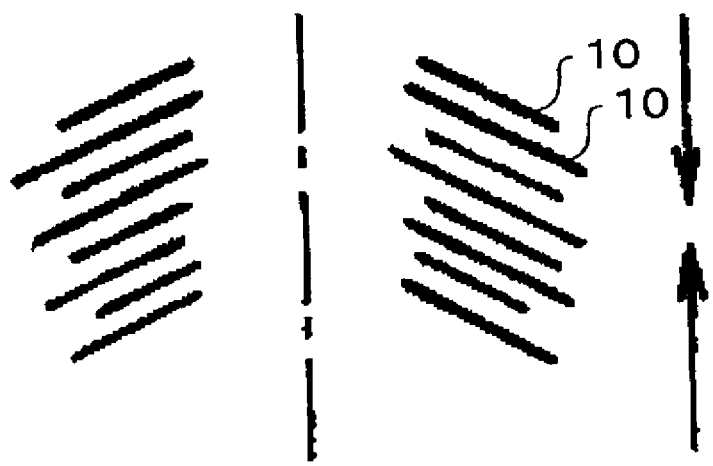
FIG. 12 is a view showing a state in which lithium ions are released from between the hexagonal carbon layers.

The electrode material (carbon fiber) of the present embodiment is hollow with no bridge at a length ranging from several tens of nanometers to several tens of microns, in which a number of hexagonal carbon layers 10 in the shape of a bottomless cup are stacked. Therefore, the electrode material has characteristics by which the electrode material expands and contracts in the longitudinal direction. When lithium ions 40 are intercalated between the hexagonal carbon layers 10 from the outer surface side and the inner surface side, the carbon fiber expands in the longitudinal direction due to an increase in the gaps between the hexagonal carbon layers 10 (FIG. 11). On the contrary, when the lithium ions 40 are deintercalated from the gaps between the hexagonal carbon layers 10, the carbon fiber contracts in the longitudinal direction due to a decrease in the gaps between the hexagonal carbon layers 10 (FIG. 12).

The meaning of this is as follows. Stress caused by repeated intercalation and deintercalation of the lithium ions 40 is absorbed by expansion and contraction of the carbon fiber. The lithium ions 40 are intercalated or deintercalated from not only the outer surface but also the inner surface of the carbon fiber. Therefore, almost no physical stress is applied to the carbon fiber, whereby the crystal structure is not destroyed. This improves and stabilizes high output characteristics and lifetime performance of the battery.

In the case of using graphite as the anode material, the crystal structure tends to be destroyed since graphite expands by intercalation of lithium ions due to intercalation of lithium ions but scarcely returns to the original state. In the case using a tube-shaped carbon fiber in which concentric hexagonal carbon layers are stacked as the anode material, since lithium ions are intercalated by force from the edges of the tube, a large amount of stress is applied repeatedly.

In the electrode material (carbon fiber) of the present embodiment, the edges of the bottomless cup-shaped hexagonal carbon layers exposed on the inner and outer surfaces of the fiber have an extremely high degree of activity. The lithium ions 40 are easily adsorbed on these highly active edges. Therefore, the electrode material can store a large number of lithium ions 40, whereby capacity of the battery can be increased. Moreover, since an electrolyte is introduced and held in the center hole 14 of the carbon fiber, a large number of lithium ions 40 can be stored on the edges exposed inside the fiber, and the capacity of the battery can be increased.

The carbon fiber having the herring-bone structure thus obtained is a short fiber with a length of several tens of microns in which several tens of thousands to several hundreds of thousands of bottomless cup-shaped, specifically, truncated conical tubular hexagonal carbon layers are stacked. This short fiber is insoluble due to a high molecular weight (length).

The carbon fiber product according to one embodiment of the present invention is obtained by dividing the above short fiber into pieces in which one to several hundreds of hexagonal carbon layers are stacked. The carbon fiber product becomes soluble if the molecular weight is reduced by decreasing the number of stacked layers, in particular, if the number of hexagonal carbon layers is one.

The short fiber may be divided by adding an appropriate amount of water or solvent and grinding the short fiber slowly using a mortar and pestle.

Specifically, the short fiber (in which the deposited layers 12 may be formed, or part or all of the deposited layers 12 maybe removed) is placed in a mortar, and ground mechanically and slowly using a pestle.

The carbon fiber in which one to several hundreds of hexagonal carbon layers are stacked can be obtained by experimentally determining the treatment time in a mortar.

Since the cyclic hexagonal carbon layers have a comparatively high strength and are bonded to one another by only a weak Van der Waals force, the cyclic hexagonal carbon layers are separated without being crushed between layers in which the bond is particularly weak.

It is preferable to grind the short fiber using a mortar and pestle in liquid nitrogen. Water in air is absorbed when liquid nitrogen is evaporated and becomes ice. Therefore, the short fiber can be separated between the above unit fiber layers while reducing mechanical stress by grinding the short fiber together with ice using a mortar and pestle.

The carbon fiber may be ground by ball milling on an industrial scale.

An example of adjusting the length of the carbon fiber by ball milling is described below.

A ball mill manufactured by Kabushikigaisha Asahi Rika Seisakujo was used.

Balls used were made of alumina with a diameter of 5 mm. 1 g of the above carbon fiber, 200 g of alumina balls, and 50 cc of distilled water were placed in a cell, and treated at a rotational speed of 350 rpm. The carbon fiber was sampled when 1, 3, 5, 10, and 24 hours had elapsed.

Figure 13:
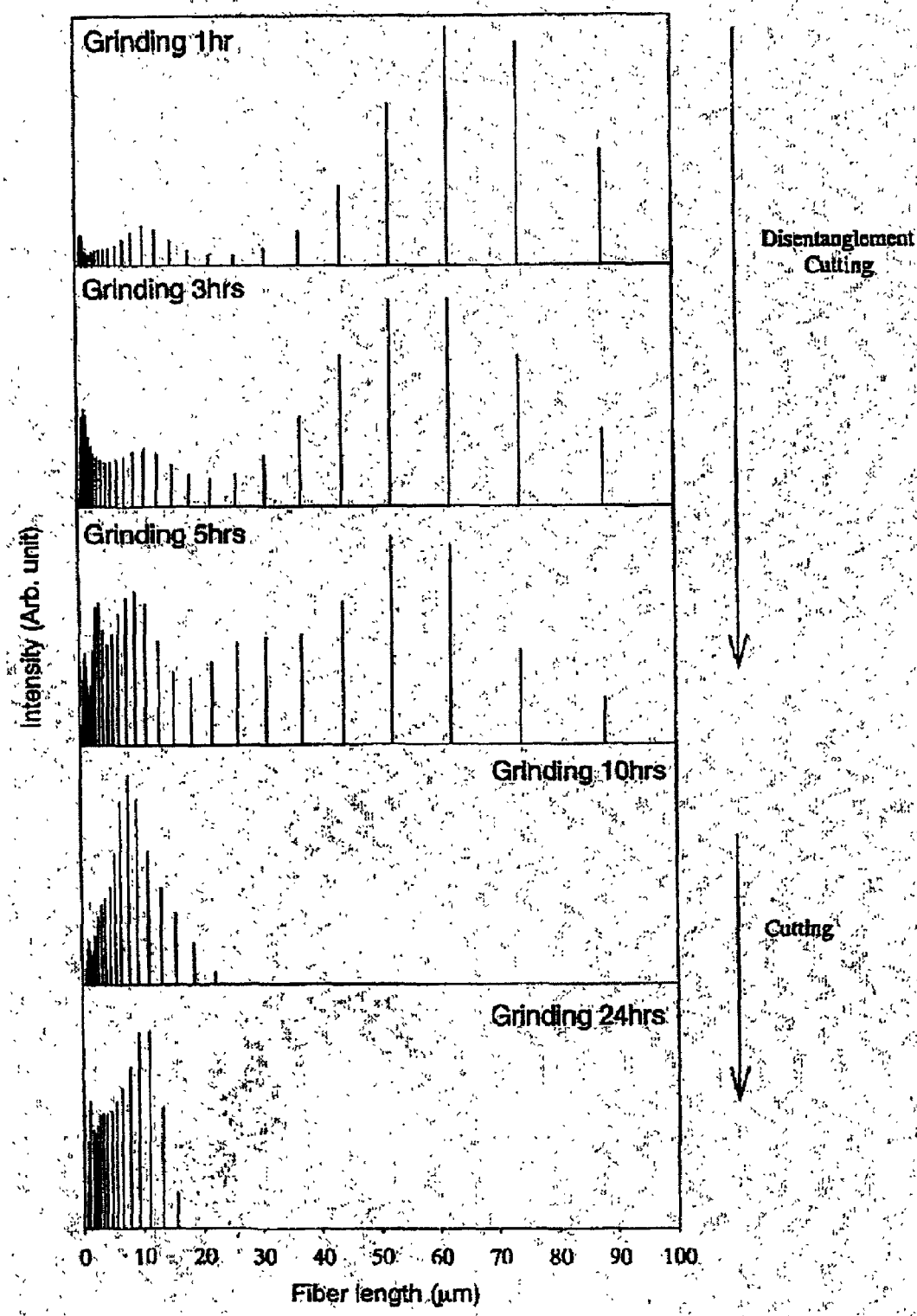
FIG. 13 is a graph showing distributions of the length of the carbon fiber with the passage of time at the time of grinding by ball milling.

FIG. 13 shows distributions of the length of the carbon fiber measured using a laser particle size distribution analyzer at each sampling time.

As is clear from FIG. 13, the fiber length is decreased with the passing of milling time. In particular, the fiber length is decreased rapidly to 10 $\mu$m or less after 10 hours have elapsed. Another peak appears at about 1 $\mu$m after 24 hours have elapsed. This clearly shows that the fiber length was further decreased. The reason why the peak appears at about 1 $\mu$m is considered to be because the length almost equals the diameter, whereby the diameter is counted as the length.

Figure 14:
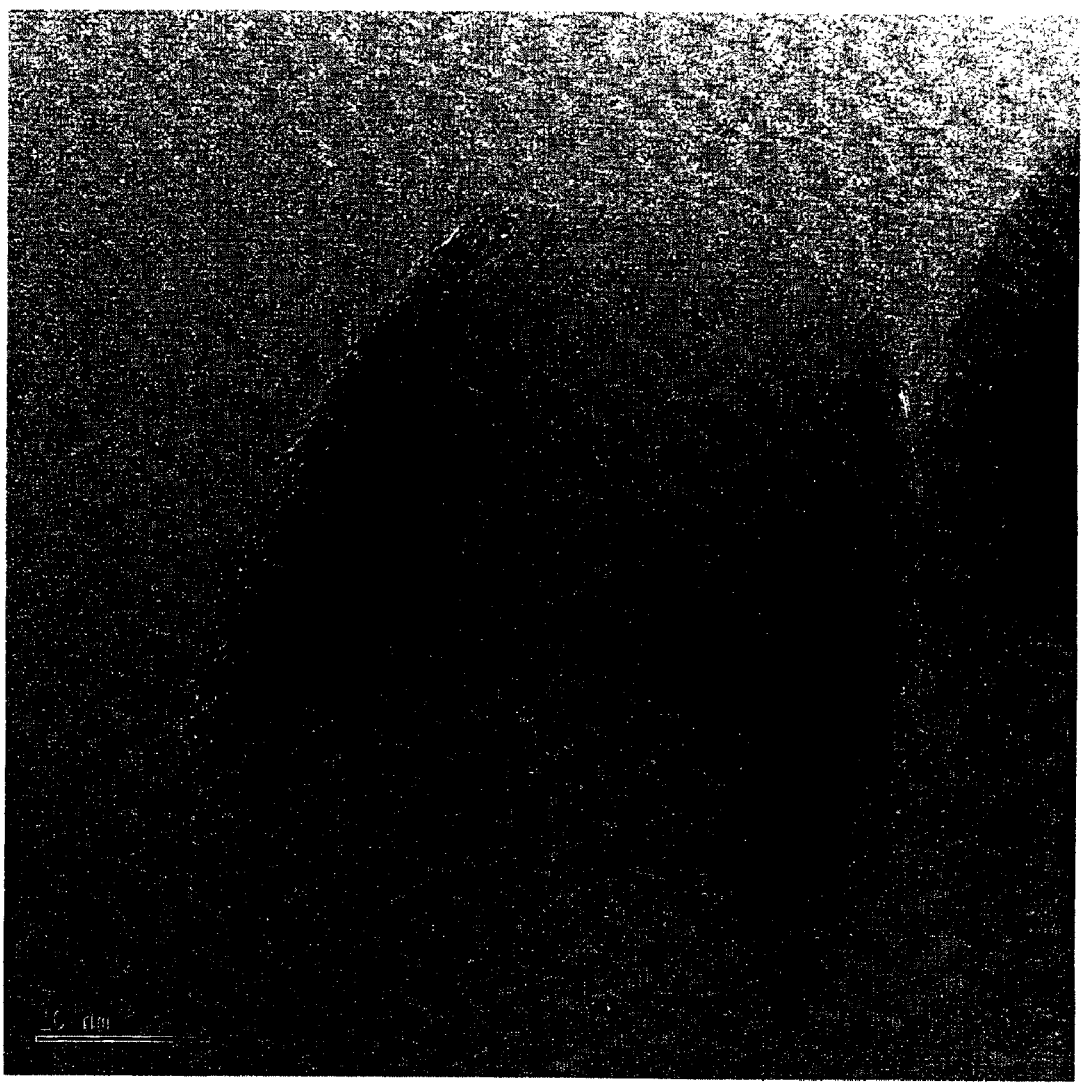
FIG. 14 is a copy of a transmission electron micrograph showing a state in which the carbon fiber is divided into a carbon fiber product in which several tens of bottomless cup-shaped hexagonal carbon layers are stacked.

FIG. 14 is a copy of a transmission electron micrograph of a very interesting carbon fiber of which the length is adjusted in a state in which several tens of bottomless cup-shaped hexagonal carbon layers are stacked. The carbon fiber has a hollow shape with no bridge. The edges of the hexagonal carbon layers are exposed on the outer surface side and the inner surface side of the hollow portion. The length of the carbon fiber may be adjusted by changing the ball milling conditions or the like.

The carbon-fiber shown in FIG. 14 is in the shape of a tube with a length and a diameter of about 60 nm which has a thin wall and a large hollow portion.

The carbon fiber is divided as a result of falling from the bottomless cup-shaped hexagonal carbon layer. Therefore, the shape of the hexagonal carbon layers is not changed.

In the case where a conventional concentric carbon nanotube is ground, breakage of the tube may cause occurrence of cracks on the outer surface in the axial direction or fine split. Moreover, a state in which the core comes off may occur. Therefore, it is difficult to adjust the length.

Since the carbon fiber becomes a minute particle by adjusting the length, dispersibility in the binder is increased. This increases adhesion to the binder, whereby lifetime of the electrode is increased.

Since the edges of the bottomless cup-shaped hexagonal carbon layers are further exposed, lithium ions are easily adsorbed on these highly active edges. Therefore, a large number of lithium ions 40 are stored, whereby the capacity of the battery can be further increased. Moreover, an electrolyte is easily introduced into the center hole 14 of the carbon fiber and held therein. This helps the capability of storing a large amount of lithium ions on the edges exposed inside the fiber, whereby the capacity of the battery can be further increased.

The carbon fiber having a herring-bone structure is described above.

The carbon fiber according to the present embodiment is a carbon fiber in which the above carbon fiber is doped with boron atoms (part of carbon atoms of the hexagonal carbon layers are replaced with boron atoms).

Replacing (doping) with boron atoms is achieved by mixing the carbon fiber with boron oxide ($B_2O_3$) or boron powder so that the boron content is 5 wt %, for example, and subjecting the mixture to a heat treatment at a temperature of 2500° C. or more for about ten minutes in a non-oxidizing atmosphere such as in a graphite resistance furnace or in argon. This treatment enables replacement with 1 to 10 atomic percent of boron atoms.

The interatomic distance between the boron atom and carbon atom is increased as a result of substitution of the boron atoms for the carbon atoms of the hexagonal carbon layers. As a result, wide-based conical projections with a boron atom at the top are formed on the smooth hexagonal carbon layers.

These projections are formed on the front surface and the back surface of the bottomless cup-shaped hexagonal carbon layers. This causes the hexagonal carbon layers to be complicated in a zigzag shape, whereby the cup-shaped layers are barely separated. As a result, the carbon fiber is reinforced.

As described above, the carbon fiber of the present embodiment, in which the hexagonal carbon layers in the shape of a bottomless cup are stacked, has characteristics by which the hexagonal carbon layers are easily separated so that the fiber length can be adjusted. However, it is preferable that the hexagonal carbon layers be not separated after the fiber length is adjusted.

In this respect, replacing with the boron atoms increases the interlayer physical strength, whereby the hexagonal carbon layers are barely separated. This increases the strength, so that the lifetime of a lithium secondary battery can be increased.

Moreover, since the projections are formed on the hexagonal carbon layers by replacement with the boron atoms, conductive paths for lithium ions are formed between the layers. This enables lithium ions to be easily intercalated or deintercalated between the layers, whereby the capacity can be further increased.

An anode of the lithium secondary battery is formed by applying the electrode material secured using a binder to electrode foil such as copper foil, and curing the binder. An epoxy resin, Teflon (trade name) resin, or the like may be used as the binder. The binder content about 5 wt % will suffice. In the case of forming the anode, graphite may be used as an essential material and the above electrode material may be added thereto as an additive.

A cathode is formed by applying the electrode material and a lithium-containing oxide, secured using the binder, to electrode foil such as aluminum foil, and curing the binder. As the lithium-containing oxide, oxides such as $LiCoO_2$, $LiMn_2O_4$, or $LiNiO_2$ may be used.

In the case of using the carbon fiber as an additive to the electrode, the carbon fiber is added in an amount of 1 wt % or more.

As an electrolyte, conventional liquid or gelled electrolyte such as a liquid electrolyte containing propylene carbonate as a solvent and lithium perchlorate as a solute, or a gelled polymer electrolyte produced by adding a small amount of an organic polymer to the liquid electrolyte may be used.

A lithium secondary battery is formed by attaching leads to the anode and the cathode, winding the anode and the cathode around an insulating separator formed of a porous film interposed therebetween, placing the anode and the cathode in a case, and sealing them by immersing in an electrolyte.

Figure 15:
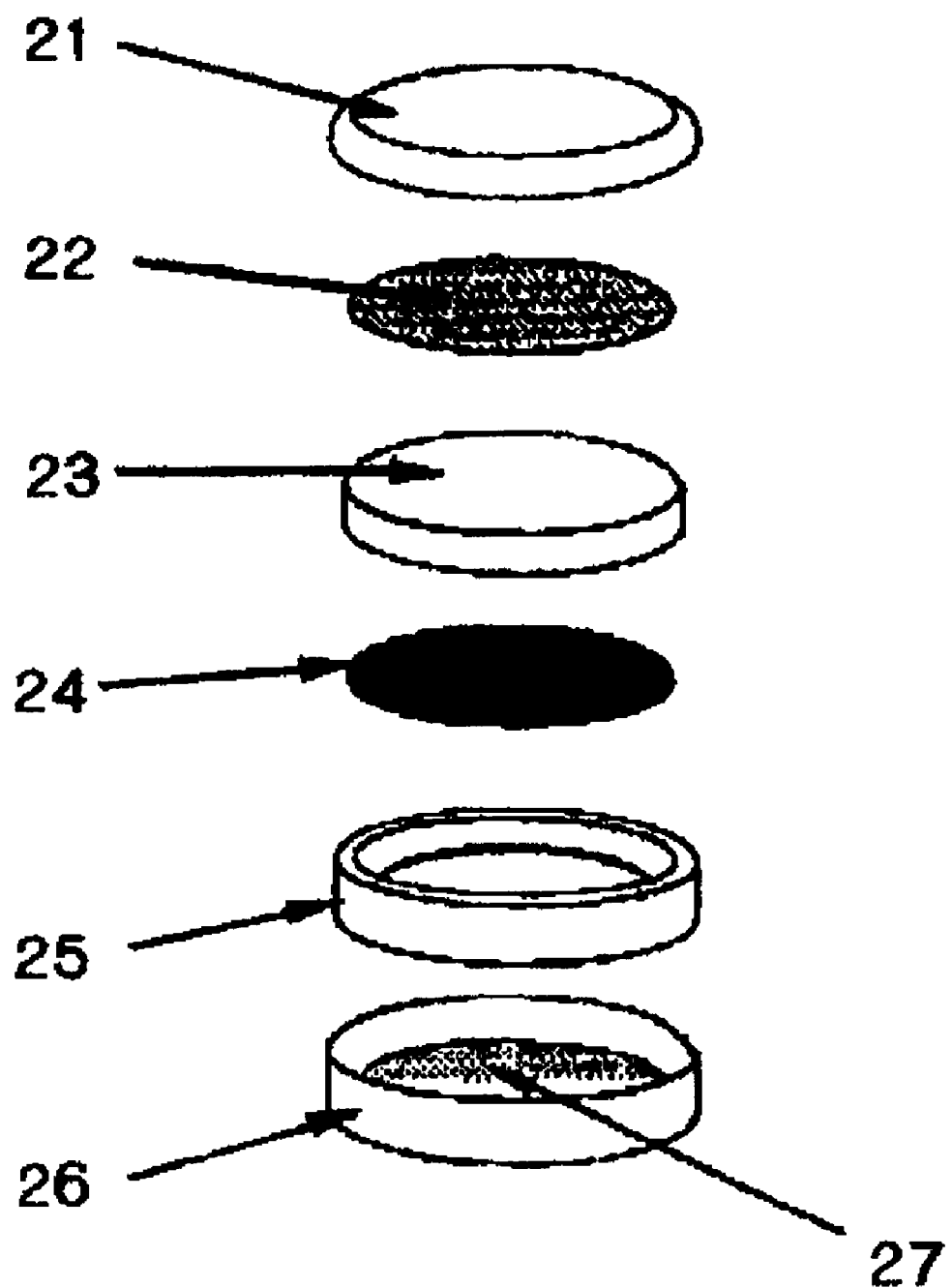
FIG. 15 is a view showing a structure of a button-type lithium secondary battery.

FIG. 15 is a view showing a button-type lithium secondary battery.

An upper cover 21, a cathode 22, a glass filter 23, an anode (anode material+PTFE) 24, a packing ring 25, a lower cover 26, and an electrolyte 27 are illustrated.

Figure 16:
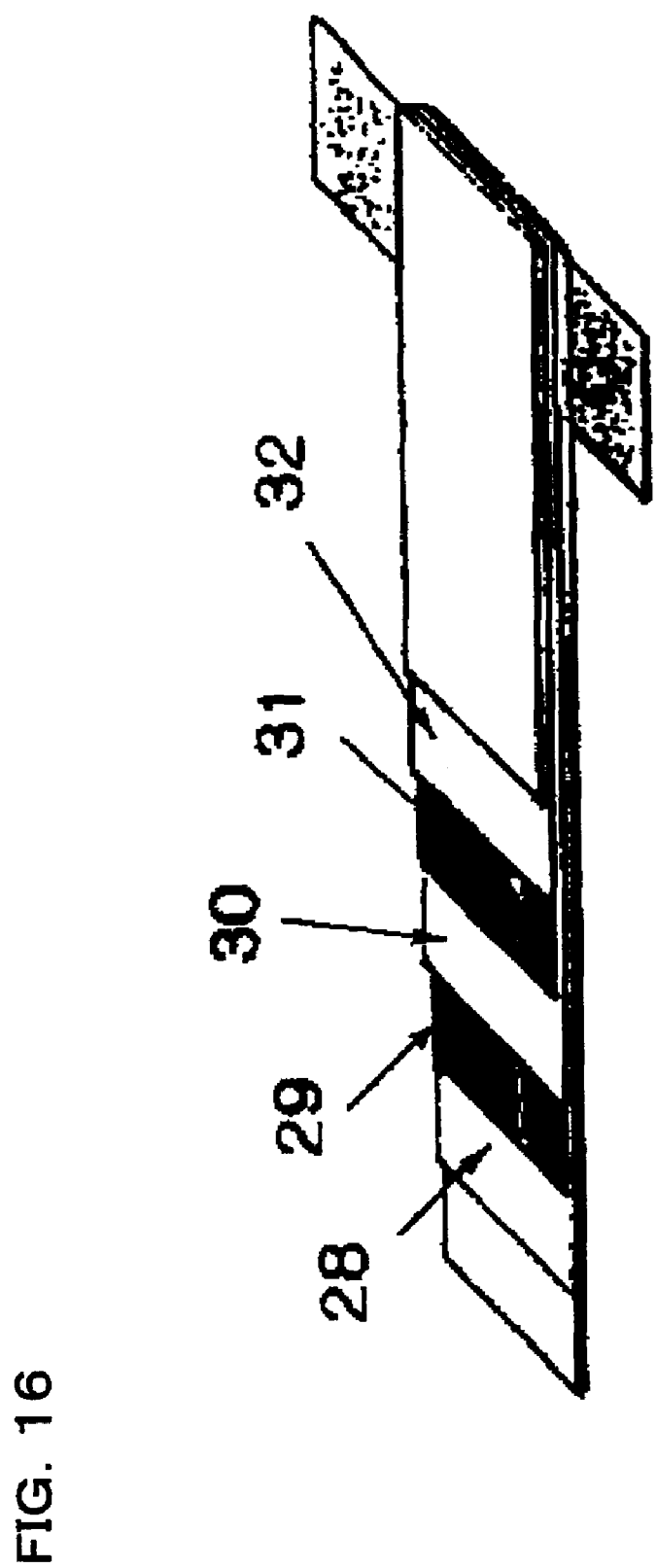
FIG. 16 is a view showing a polymer-type lithium secondary battery.

FIG. 16 is a view showing a polymer-type lithium secondary battery.

An electrode film 28, an anode 29, a polymer electrolyte 30, and an electrode film 32 are illustrated.

As described above, in the present embodiment, the hollow carbon fiber with no bridge at a length ranging from several tens of nanometers to several tens of microns, in which a number of hexagonal carbon layers 10 in the shape of a bottomless cup are stacked, is used as the electrode material. Therefore, the carbon fiber is strong enough to withstand stress such as buckling, tension, and twisting due to its flexibility, whereby the carbon fiber excels in reinforcing effect on the electrodes in comparison with a conventional tube-shaped carbon fiber. Moreover, the carbon fiber excels in conductivity as the electrode material.

In particular, in the case of using the electrode material for the anode, excellent storage and release capability of lithium ions and high energy density were achieved. This leads to a remarkable increase in the capacity. Moreover, since this carbon fiber has elasticity and expands or contracts corresponding to intercalation or deintercalation of lithium ions, stress is absorbed and the crystal structure is not destroyed even if the charge and discharge are repeated. The layers are scarcely separated by replacement with the boron atoms. Therefore, the electrode excels in lifetime performance.

The carbon fiber may be used for various types of applications such as an anode material for primary and secondary lithium batteries, and members of fuel cells (polymer electrolyte membrane, catalyst support, separator, and the like).

As described above, according to the present embodiment, an electrode material for a lithium secondary battery excelling in output characteristics, lifetime performance, and stability of performance, enabling an increase incapacity, and excelling in conductivity and electrode reinforcement, and a lithium secondary battery can be provided.

What is claimed is:

1. An electrode material for a lithium secondary battery comprising a carbon fiber,
   wherein the carbon fiber has a coaxial stacking morphology of truncated conical tubular graphene layers;
   wherein each of the truncated conical tubular graphene layers includes a hexagonal carbon layer and has a large ring end at one end and a small ring end at the other end in an axial direction;
   wherein at least part of edges of the hexagonal carbon layers is exposed at the large ring ends; and
   wherein part of carbon atoms of the hexagonal carbon layers are replaced with boron atoms, so that projections with the boron atoms at the tops are formed.

2. The carbon fiber as defined in claim 1,
   wherein at least part of edges of the hexagonal carbon layers is exposed at the small ring ends.

3. The carbon fiber as defined in claim 2,
   wherein the coaxial stacking morphology of the truncated conical tubular graphene layers is vapor grown; and
   wherein at least part of a deposited film formed during the vapor growth is removed from the large and small ring ends.

4. The carbon fiber as defined in claim 1,
   wherein the coaxial stacking morphology of the truncated conical tubular graphene layers has a shape of a hollow core with no bridge.

5. The carbon fiber as defined in claim 1,
   wherein an outer surface of the carbon fiber is formed of the large ring ends stacked in the axial direction; and
   wherein the exposed part of the edges of the hexagonal carbon layers has an area equal to or more than 2 percentages of an area of the outer surface.

6. The carbon fiber as defined in claim 5,
   wherein positions of the large ring ends forming the outer surface are irregular, and the outer surface has minute irregularity at the level of atoms.

7. The carbon fiber as defined in claim 1,
   wherein an inner surface of the carbon fiber is formed of the small ring ends stacked in the axial direction; and
   wherein positions of the small ring ends forming the inner surface are irregular, and the inner surface has minute irregularity at the level of atoms.

8. The carbon fiber as defined in claim 1,
   wherein one to several hundreds of the hexagonal carbon layers are stacked.

9. The carbon fiber as defined in claim 1,
   wherein heat treatment at a temperature equal to or more than 2500° C. provides no graphitization of the carbon fiber product.

10. The carbon fiber as defined in claim 1,
    wherein heat treatment at a temperature equal to or more than 2500° C. provides no disappearance of the D peak ($1360 \text{ cm}^{-1}$) in the Raman spectrum.

11. An electrode material for a lithium secondary battery comprising the carbon fiber as defined in claim 1.

12. A lithium secondary battery comprising the carbon fiber as defined in claim 1 as an electrode material.

* * * * *